United States Patent [19]

Vogel

[11] Patent Number: 4,762,452
[45] Date of Patent: Aug. 9, 1988

[54] ATTACHMENT NUT WITH ANTI-BACK UP MEANS

[75] Inventor: William C. Vogel, Sandusky, Ohio
[73] Assignee: General Motors Corporation, Detroit, Mich.
[21] Appl. No.: 92,763
[22] Filed: Sep. 3, 1987
[51] Int. Cl.⁴ .......................................... F16B 34/284
[52] U.S. Cl. ................................. 411/194; 411/207; 411/228; 411/970
[58] Field of Search ................. 411/6, 7, 193, 194, 411/207, 208, 120, 121, 227–229, 254, 970

[56] References Cited

U.S. PATENT DOCUMENTS

| 647,962 | 4/1900 | Hall | 411/227 |
| 880,939 | 3/1908 | Virgo | 411/193 |
| 1,235,864 | 8/1917 | Whaley | 411/207 |
| 1,373,335 | 3/1921 | Kimball | 411/206 |
| 1,414,188 | 4/1922 | Jones et al. | 411/204 |

OTHER PUBLICATIONS

"Popular Science", Apr. 1988, p. 106, Feature Entitled Kindness to Bearings, by Steve Mercaldo.

*Primary Examiner*—Neill R. Wilson
*Attorney, Agent, or Firm*—Patrick M. Griffin

[57] ABSTRACT

An economical alternative to throw away lock nuts is provided by a retainer that fits to or over a conventionally threaded nut. Splines on the shaft, and resilient fingers on the retainer, are mismatched in number by one, assuring that they interfit with at least one finger blocked by a spline, or closed to it, so that the nut cannot be turned significantly back. The retainer can be easily removed, so that both it and the nut may be reused.

3 Claims, 2 Drawing Sheets

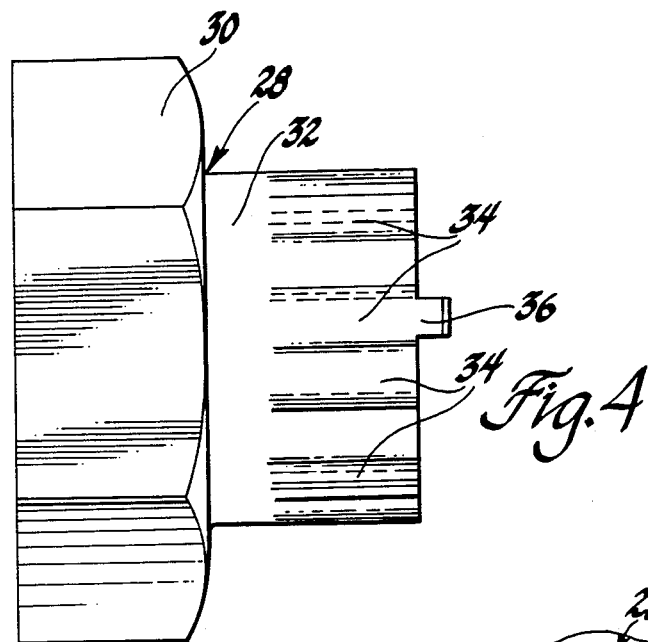
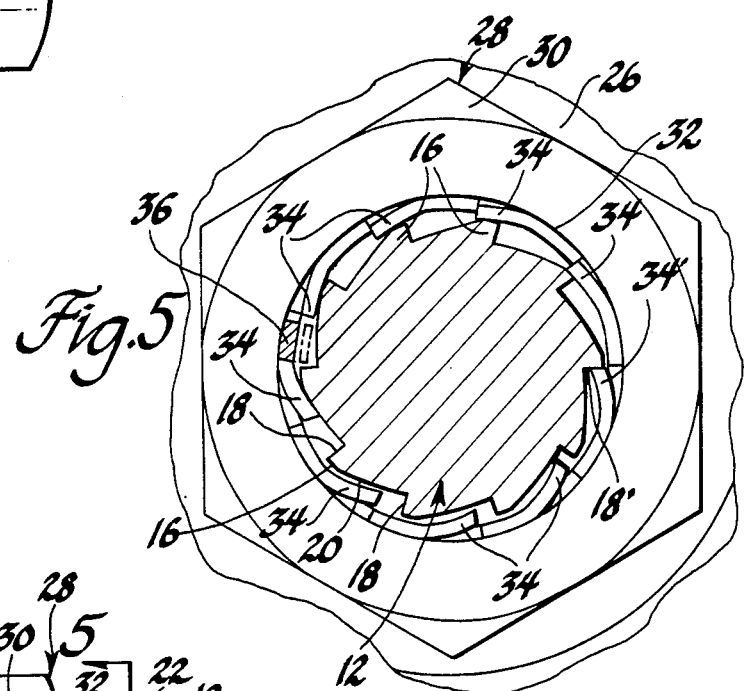
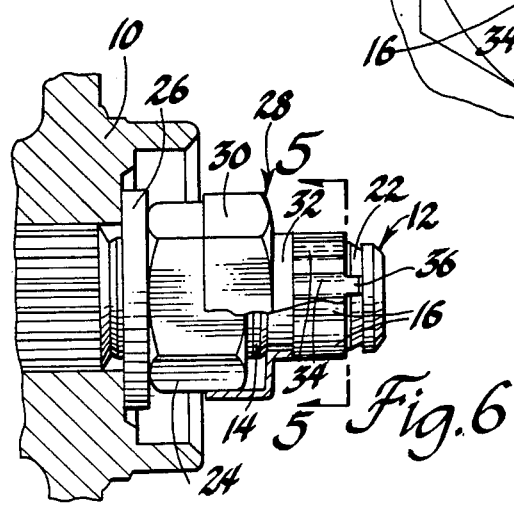

ATTACHMENT NUT WITH ANTI-BACK UP MEANS

This invention relates to attachment nuts in general, and specifically to a means for preventing a conventionally threaded nut from loosening.

BACKGROUND OF THE INVENTION

Attachment nuts that incorporate an anti-loosening feature or anti-back up feature, generally referred to as lock nuts or torque nuts, are well known in the art. These attachment nuts often have threads designed to deform as the nut is tightened down with a predetermined amount of torque, preventing it from loosening thereafter. A typical application for such fasteners in the automotive industry is to fix a wheel bearing assembly to the end of a shaft. While they work well mechanically, the common drawback to such fasteners is cost. Besides being much more expensive initially than a conventionally threaded nut, they are, by definition, not reusable, since they deform at final tightening. It would be desirable, if possible, to provide a workable, economical anti-loosening capability for a conventionally threaded, reusable nut.

SUMMARY OF THE INVENTION

The invention provides such an economical alternative. A retainer cooperates with a specially configured portion of the shaft to prevent a conventionally threaded, hex sided attachment nut from loosening.

The preferred embodiment is disclosed in an automotive application, specifically for attaching a driven front wheel bearing assembly to an axle shaft. The shaft has a threaded portion near, but not directly at, the end thereof. On that part of the shaft adjacent the threaded portion is formed a series of axially extending, circumferentially spaced splines. In addition, in the embodiment disclosed, there is a circumferential groove formed in said shaft between the splines and the end of the shaft. The nut slides over the end of the shaft without engaging the splined portion of the shaft, where it then engages the shaft threaded portion and may be turned down to its tightened position, against a shoulder of the bearing assembly that it attaches.

The invention also includes a slip on retainer having a skirt sized so as to fit non-turnably over the outside of the hex nut and a generally cylindrical sleeve adjacent the skirt and and sized so as to fit over the splined portion of the shaft. In the embodiment disclosed, the sleeve also includes a tab that fits into the shaft groove. A series of circumferentially spaced fingers is lanced into the retainer sleeve, which extend radially inwardly far enough to be able to fit between the splines. Furthermore, the splines are oriented so as to flex freely over the splines if the retainer is turned in the tightening direction of the nut, but to be blocked between the splines if it is attempted to turn the retainer in the other direction. Significantly, the fingers mismatch the splines in number, being one less.

After the nut has been threaded to its tightened position, or close to it, the retainer skirt may be pushed over the outside of the nut as the sleeve fits over the shaft splines and the fingers slide axially along the splines. When the retainer is fully seated, the tab fits into the shaft groove. The mismatch between the number of fingers and splines assures that one finger will be located directly between an adjacent pair of splines, whatever the rotational position of the nut, as opposed to all fingers resting on top of a spline, as could occur with a matched number. Therefore, the retainer, and the nut to which it is non turnably attached, will not be able to turn significantly in the loosening direction before the one finger is blocked, thereby preventing further turning. The tab and groove, meanwhile, serve to assure that the retainer skirt does not slide off of the outside of the nut.

It is, therefore, an object of the invention to economically provide an anti-loosening capability to a conventional attachment nut.

It is another object of the invention to provide such a capability with a retainer and a specially configured portion of the shaft adjacent to the threaded portion of the shaft which cooperate to assure that the nut cannot be turned significantly back from its tightened position.

It is another object of the invention to provide such a cooperating retainer and shaft portion in which a series of fingers on the retainer is mismatched in number relative to a series of splines on the shaft, so that, whatever the position of the nut relative to the splines when it is tightened, one finger will be blocked by a spline to prevent the nut from turning back significantly.

DESCRIPTION OF THE PREFERRED EMBODIMENT

These and other objects and features of the invention will appear from the following written description, and from the drawings, in which:

FIG. 4 is a side view of the retainer before it is installed;

FIG. 5 is a sectional view taken along the line 5—5 of FIG. 6;

FIG. 6 is a view like FIG. 3, but after the retainer has been installed.

Figure 1:
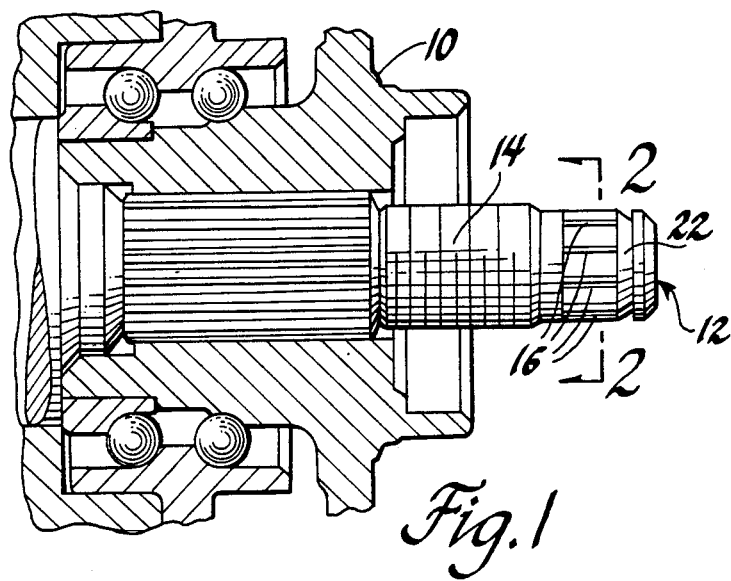
FIG. 1 is a view showing the end of the shaft in elevation and a front wheel bearing to be attached thereto in cross section.
Figure 2:
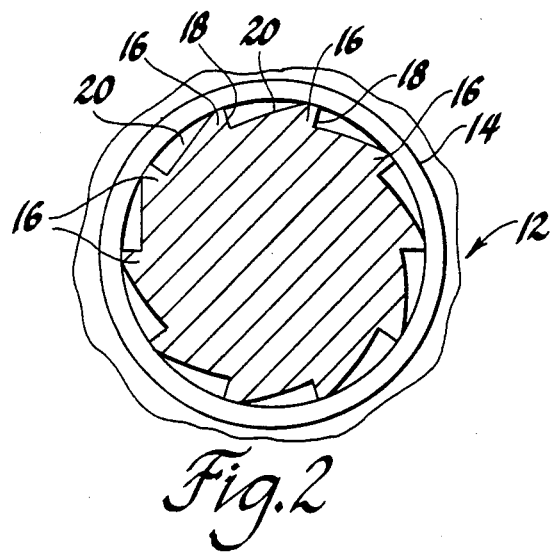
FIG. 2 is a sectional view taken along the line 2—2 of FIG. 1.
Figure 3:
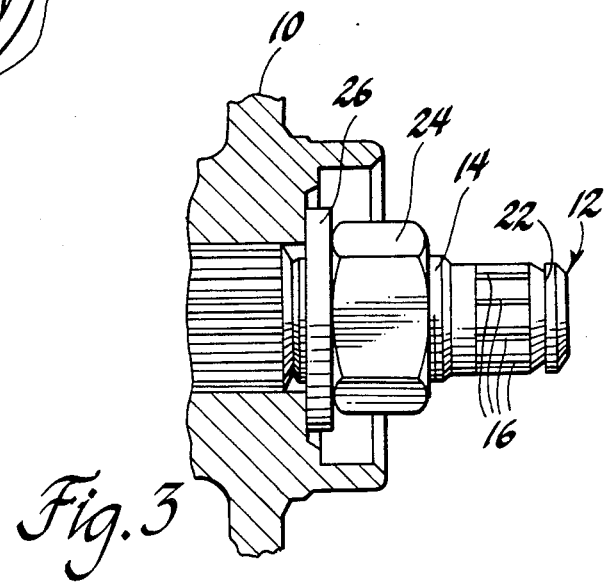
FIG. 3 is a view of just the end of the shaft as in FIG. 1, but with the nut in tightened position.

Referring first to FIGS. 1, 2 and 3, the invention is used to attach a driven front wheel bearing 10 to the axle shaft, designated generally at 12. Shaft 12 has a threaded portion 14 near, but not directly at, the end thereof. A series of ten axially extending, evenly circumferentially spaced splines, each designated generally at 16, is formed on shaft 12. Splines 16 are adjacent to threaded portion 14, but do not extend all the way out to the end of shaft 12. As best seen in FIG. 2, splines 16 have an outermost diameter that is less than the outermost diameter of the threaded portion 14, and each has a flat face 18 on the right side and a sloped face 20 on the left side, for a reason described below. While a conventional shaft 12 will have the threaded portion 14, it will not have the splines 16. However, splines 16 may be very economically roll formed to shaft 12 when shaft 12 is initially manufactured, without changing its basic size or configuration. In addition, there is a circumferential groove 22 cut into shaft 12, between the end thereof and the splines 16. A conventionally threaded hex sided nut 24 slides over the end of the shaft 12 without engaging the splines 16, because of the relative diameters noted above, and threads onto threaded portion 14 as far as a tightened position shown in FIG. 3, where it bears on a washer 26. Washer 26, in turn, bears on a shoulder of bearing 10, thereby fixing bearing 10 to shaft 12. Splines 16 and groove 22 cooperate with other structure of the invention, described next, to keep nut 24 from backing off from the tightened position.

Referring next to FIGS. 4 and 5, the invention also includes a slip on retainer, designated generally 28, which is formed conveniently as a one piece metal stamping. Retainer 28 has a hex shaped skirt 30 that is sized to slip fit closely and non-turnably over the outside of hex nut 24, but not so tightly as to be difficult to apply. A cylindrical sleeve 32 adjacent skirt 30 is sized so as to fit over splines 16 as skirt 30 is pushed onto nut 24. Lanced into sleeve 32 is a series of nine evenly circumferentially spaced fingers 34. The material of retainer 28 has enough resilience that the fingers 34 are resilient and flexible. As best seen in FIG. 5, fingers 34 extend radially inwardly far enough to be able to fit between the splines, 16, and are sloped in the same direction as the spline faces 20, for a purpose described below. Finally, in the embodiment disclosed, sleeve 32 also includes a tab 36 sized so as to fit into shaft groove 22, which may be resilient with a permanent downward bend, or deformable, and initially straight.

The operation of the invention may be understood by referring to FIGS. 5 and 6. After the 24 nut has been threaded to its tightened position, or close to it, the retainer skirt 30 may be pushed over the outside of the nut 24. Concurrently, sleeve 32 slides over splines 16 and the fingers 34 slide axially along the splines 16. Once skirt 20 is fully seated, tab 36 fits into groove 22, either by snapping in automatically, or by being later bent down. This assures that retainer 28 can not slide axially back off. The mismatch between the number of fingers 34 and splines 16, the fingers 34 being one fewer, assures that not all fingers 34 can rest on top of a spline 16, that is, at the juncture of the spline faces 18 and 20, whatever the rotational position of nut 24 relative to the splines 16. Therefore, one finger, in this case designated 34' will be located directly between an adjacent pair of splines 16, that is, with the end of finger 34' against or very close to, a spline flat face 18'. If nut 24 is not fully tightened when retainer 28 is seated, it may be turned further, in the clockwise direction of FIG. 5. Again, because of the mismatch of splines 16 and fingers 34, even with further turning of nut 24, the end of some finger 34 will rest against or close to a spline back face 18. Therefore, if it were attempted to turn the nut 24 and retainer 28 in the opposite direction, counterclockwise as seen in FIG. 5, the one finger 34' would be blocked by the spline face 18' before the nut 24 and retainer 28 could turn significantly. The greater the number of splines 16 and fingers 34, so long as they are mismatched by one, the closer a finger 34 is likely to rest to a spline flat face 18, and the more immediate will be the blocking action in the event of an attempt to loosen nut 24. Bending tab 36 back up and pulling retainer 28 would allow nut 24 to be threaded off, and both nut 24 and retainer 28 would be reusable. Thus, a low cost alternative to the expensive lock nut described above is provided.

Variations of the preferred embodiment described above may be made within the spirit of the invention. If it were not necessary to turn nut 24 any more after retainer 28 was installed, then it would not be necessary for fingers 34 to be freely flexible in the tightening direction, so long as they were inflexible in the loosening direction. Then, the spline sloped faces 20 would not be necessary, and a greater number of splines 16 could be formed in the space available, which as noted above, could be an advantage. However, it is still an advantage to be able to turn nut 24 after retainer 28 has been installed, which also allows retainer 28 to be attached to nut 24 before it is threaded on, if desired, since turning in the tightening direction would not be impeded. Attaching retainer 28 permanently, or through a tight press fit, would allow tab 36 and groove 22 to be dispensed with, since the retainer 28 would not be subject to slipping off. However, all the features of the embodiment disclosed, including the orientations of the spline faces 20 and fingers 34, the easy slip fit of skirt 30 to nut 24, and the tab 36 and groove 22, cooperate to allow retainer 28 to be easily applied after nut 24 is already threaded on, and to allow nut 24 to be further turned, if necessary, after retainer 28 is applied.

The embodiments of the invention in which an exclusive property or privilege is claimed are defined as follows:

1. A means for preventing a conventionally threaded nut from loosening from a tightened position on a threaded portion of a shaft, comprising in combination,
 a series of axially extending, circumferentially spaced splines formed on said shaft adjacent to said shaft threaded portion, and,
 a retainer attached non-turnably to said nut and having a generally cylindrical sleeve sized so as to fit over the splined portion of said shaft, said sleeve further including a series of circumferentially spaced resilient fingers thereon extending radially inwardly therefrom sufficiently far to be able to fit between said splines, said fingers further being oriented so as to be freely flexible over said splines only when said retainer is turned in the direction of nut tightening and being one less in number than said splines,
 whereby, as said nut is threaded to its tightened position, said resilient retainer fingers can flex freely over said splines until said nut stops at its tightened position, whereupon said mismatch between the number of fingers and splines assures that one finger will be located substantially between an adjacent pair of splines so that said nut and retainer will not be able to turn significantly in the loosening direction before being blocked.

2. A means for preventing a conventionally threaded nut from loosening from a tightened position on a threaded portion of a shaft, comprising in combination,
 a series of axially extending, circumferentially spaced splines formed on said shaft adjacent to said shaft threaded portion, and,
 a retainer having a skirt sized so as to slide tightly and non-turnably over the outside of said nut and a generally cylindrical sleeve adjacent thereto and sized so as to fit over the splined portion of said shaft, said sleeve further including a series of circumferentially spaced fingers thereon extending radially inwardly therefrom sufficiently far to be able to fit between said splines, said fingers further being oriented so as to be substantially inflexible when said retainer is turned in the direction of nut loosening and being one less in number than said splines,
 whereby, after said nut has been threaded to its tightened position, said retainer skirt may be slide fitted tightly over the outside of said nut as said sleeve fits over said shaft splines, whereupon said mismatch between the number of fingers and splines assures that one finger will be located substantially between an adjacent pair of splines so that said nut and retainer will not be able to turn significantly in the loosening direction before being blocked.

3. A means for preventing a conventionally threaded nut from loosening from a tightened position on a shaft, comprising in combination, a series of axially extending, circumferentially spaced splines formed on said shaft adjacent to said shaft threaded portion, a circumferential groove formed in said shaft adjacent to said splines, and, a retainer having a skirt sized so as to slide non-turnably over the outside of said nut and a generally cylindrical sleeve adjacent thereto and sized so as to fit over the splined portion of said shaft, said sleeve further having a tab thereon sized so as to fit into said shaft groove and a series of circumferentially spaced fingers thereon extending radially inwardly therefrom sufficiently far to be able to fit between said splines, said fingers further being oriented so as to be substantially inflexible when said retainer is turned in the direction of nut loosening and being one less in number than said splines, whereby, after said nut has been threaded to its tightened position, said retainer skirt may be slide fitted over the outside of said nut as said sleeve fits over said shaft splines and said tab may be fitted into said shaft groove, whereupon said mismatch between the number of fingers and splines assures that one finger will be located substantially between an adjacent pair of splines so that said nut and retainer will not be able to turn significantly in the loosening direction before being blocked and said tab and groove assures that said retainer skirt will not slide off of the outside of said nut.

* * * * *